United States Patent [19]

Spengler

[11] Patent Number: 4,900,342

[45] Date of Patent: Feb. 13, 1990

[54] BLOWER-FILTER ASSEMBLY

[76] Inventor: Charles W. Spengler, 3310 Deforest Dr., Cincinnati, Ohio 45209

[21] Appl. No.: 236,709

[22] Filed: Aug. 26, 1988

[51] Int. Cl.$^4$ .............................................. B01D 46/00
[52] U.S. Cl. ........................................ 55/276; 55/473; 55/502; 415/119; 415/201; 416/246; 416/500
[58] Field of Search .................. 55/276, 467, 470–473, 55/502; 285/373, 419, 293; 417/360; 415/119, 201; 416/246, 500

[56] References Cited

U.S. PATENT DOCUMENTS

| 3,127,259 | 3/1964  | Boylan         | 55/DIG. 31 |
| 3,375,640 | 4/1968  | Pelosi         | 55/356     |
| 3,505,989 | 4/1970  | Truhan         | 55/385.1   |
| 3,766,844 | 10/1973 | Donnelly et al.| 98/33 R    |
| 3,877,900 | 4/1975  | Mitchell       | 55/366     |
| 3,895,929 | 7/1975  | Jysky et al.   | 55/334     |
| 3,925,043 | 12/1975 | Matrone et al. | 55/473     |
| 4,268,282 | 5/1981  | Mackenzie      | 55/101     |
| 4,350,504 | 9/1982  | Diachuk        | 55/217     |
| 4,548,627 | 10/1985 | Landy          | 55/385.1   |
| 4,732,592 | 3/1988  | Spengler       | 55/356     |

FOREIGN PATENT DOCUMENTS 1408827  6/1965  France ............... 2/DIG. 6

Primary Examiner—Bernard Nozick
Attorney, Agent, or Firm—Edwin E. Greigg

[57] ABSTRACT

A quick connect, disconnect connection between elements of a blower-filter system which makes use of adjacent compatible VELCRO strips on each element to be connected and a VELCRO tape which joins the two parts together by use of the VELCRO strips.

13 Claims, 3 Drawing Sheets

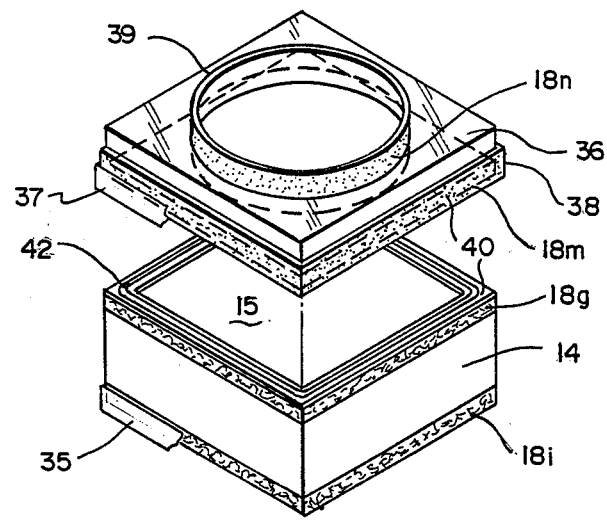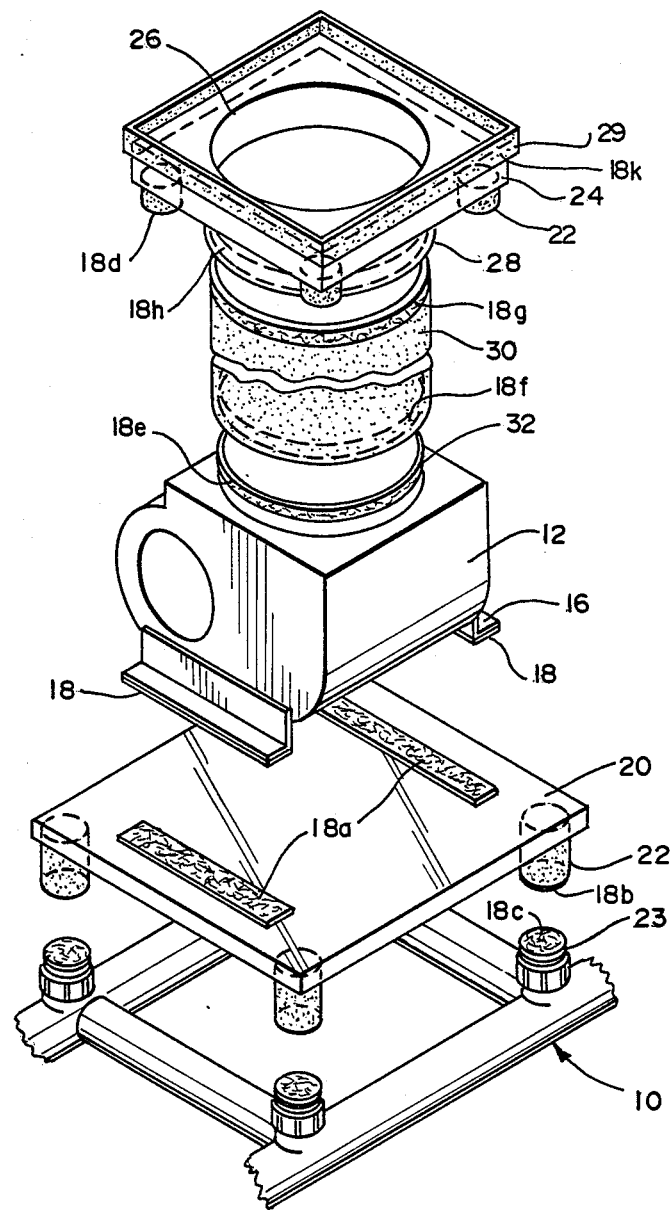
FIG.1 a
BLOWER-FILTER ASSEMBLY

BACKGROUND OF THE INVENTION

This invention relates to a quick way to assemble a blow-filter assembly without the use of any tools.

Heretofore, a blower-filter assembly such as set forth in U.S. Pat. No. 4,732,592 has been assembled and disassembled by use of nuts and bolts and or screws which require hand tools. Such an assembly or disassembly requires considerable time and effort on the part of a mechanic.

It is therefore an object of this invention to assemble and disassemble a blower-filter assembly without the use of tools and by an unexperienced person as well as by an experienced person.

Another object is to assemble and disassemble a blow-filter system in a very short time. Still another object is to be able to disassemble parts of a blower-filter assembly without disassembly of the entire assembly.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is an exploded view of the parts shown in perspective;

DETAILED DESCRIPTION

Figure 2:
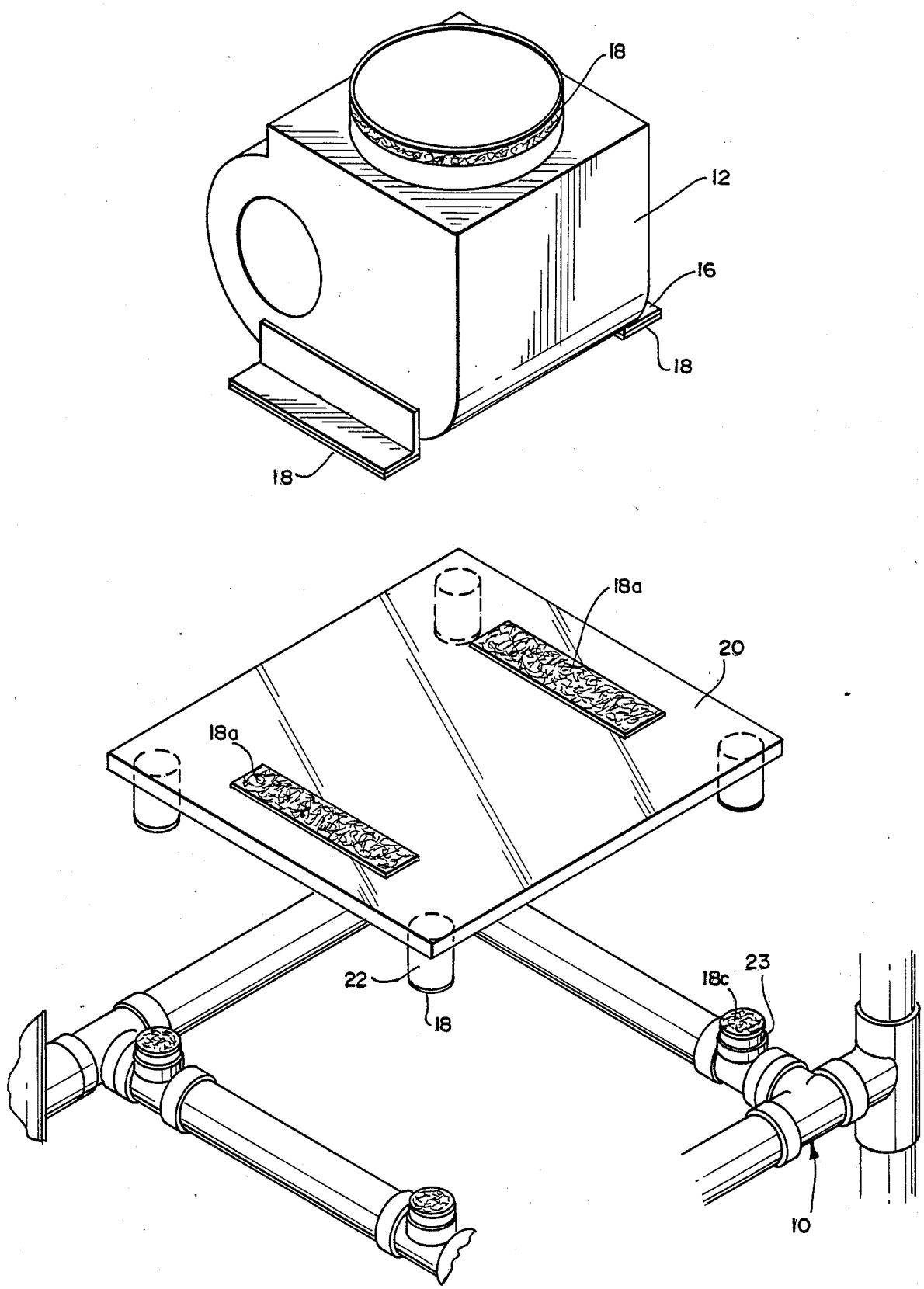
FIG. 2 illustrates an exploded view of the blower and blower mount.
Figure 3:
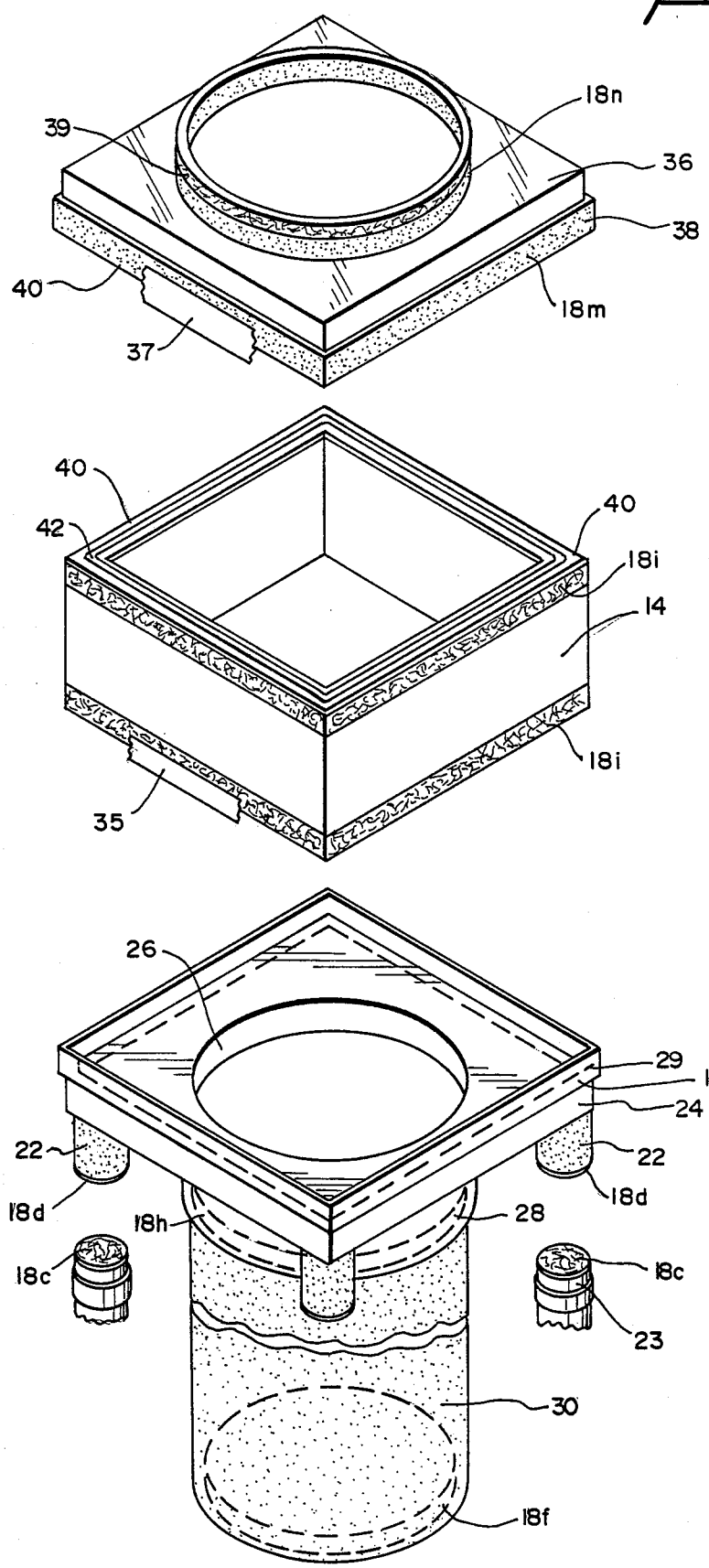
FIG. 3 illustrates an exploded view of the filter and the filter mount.

Now referring to the drawings where like parts are indicated by the same reference characters, there is shown a blower filter assembly according to this invention. A P.V.C. tubing 10 such as shown in U.S. Pat. No. 4,732,592 is used to support the blower 12 and filter housing 14 which includes filter material 15. The blower 12 is provided with supports 16 each of which are provided with a VELCRO strip 18 on the bottom surface of the supports. The blower is seated onto a plate 20 such as LEXAN on which matching VELCRO strips 18a have been aligned to correspond with the VELCRO strips on the supports. The LEXAN plate 20 is provided with vibration pads 22 on the bottom which may be closed cell gasket material near each of the corners that correspond with the supports of the frame 10. The vibration pads 22 are provided with VELCRO material 18b on the bottom surface which engage VELCRO 18c covered pads 23 on each of the supports.

The filter material 15 may be of any suitable type and the housing is supported on a LEXAN plate 24 which includes vibration pads 22 having VELCRO 18d on their bottom surfaces such as set forth for the blower 12. The vibration pads are secured on VELCRO supports having VELCRO thereon that match the VELCRO on the ends of the vibration pads. The LEXAN plate 24 is provided with a central aperture 26 which is surrounded on the bottom surface with a closed cell gasket 28 that is secured to the LEXAN plate by any suitable adhesive. The upper surface near the edge of the LEXAN plate 24 is provided with a strip of closed cell gasket material 29 upon which the filter housing is seated. A boot 30 formed of thin closed cell material is used between the upper end of the blower and the inlet 26 of the filter support plate and connected to the outside surface of the blower outlet 32 and the inside surface of the gasket material 28 secured to the bottom surface of the support plate 24. For this connection, the outside surface of the blower outlet and the mating inside surface of the boot are provided with VELCRO 18e,f. Likewise the outside surface of the boot and the mating inside surface of the gasket material 28 are provided with VELCRO 18g and 18h. Thus, the boot is secured to the outlet of the blower and to the filter support plate by VELCRO. The lower and upper outer surfaces of the filter housing are surrounded with a strip of VELCRO 18i and 18j and the closed cell gasket 29 upon which the filter seats is provided with a surrounding strip of VELCRO 18b. Thus, the spacing between the filter housing and closed cell gasket 29 is closed by a VELCRO tape 35 that surrounds the spacing and which is secured to the VELCRO 18i on the filter housing and VELCRO 18b on the gasket 29. A LEXAN plate 36 closes the filter housing at the top. The LEXAN plate is provided with a closed cell gasket 38 on the bottom edge surfaces and a strip of VELCRO is secured on the outside surface near the bottom of the gasket. Thus, a VELCRO tape 37 surrounding the upper end of the filter housing and the lower end of the gasket 38 will close any crack between the upper end of the filter housing and the lower end of the gasket. A closed cell gasket material 39 is secured to the upper surface of the top plate surrounding an outlet from the filter by use of a suitable adhesive. A VELCRO strip is provided on the outer surface of the gasket 39 to which is connected a plenum which directs air to a room or any desired area to which filtered air is to be blown.

It has been determined that in use the upper or top plate moves back and forth slightly relative to the filter housing which breaks away particles from the filter housing frame which is usually wood. Therefore, a TEFLON tape 40 is secured to the upper end surface of the filter housing and the lower end surface of the gasket 38 and a silicone paste 42 shown by thin lines is applied along the end surface of the housing so that any cracks between the two TEFLON tapes will be filled by the silicone paste. A VELCRO tape 37 is then applied around the outside of the joint between the filter housing and the gasket 38 to hold the parts together.

It is therefore seen that all joints are secured together by a VELCRO tape. The boot may be formed as a rectangular piece from which a cylindrical form is formed with the upper and lower ends secured to the outlet of the blower and the inlet to the filter. The end edges should have VELCRO along the ends so that the ends will close the boot between the blower and filter.

The system has been described using LEXAN plates, any suitable support plates may be used. Also, any suitable gasket material adhesive or glue or other material may be used which would be within the skill of one in the art.

The features set forth herein are directed to securing mating parts of a system together by the use of compatible VELCRO strips and/or tape. The example sets forth a blower filter system; however, it will be obvious that air ducts, exhaust air systems and other systems for transport of air could be secured together by the use of VELCRO. The use of VELCRO permits easy and quick assembly or disassembly of a blower filter system as well as other air conducting systems.

The foregoing relates to a preferred embodiment of the invention, it being understood that other variants and embodiments thereof are possible within the spirit and scope of the invention, the latter being defined by the appended claims.

What is claimed and desired to be secured by Letters Patent of the United States is:

1. An air flow system including air flow conductors secured together in end to end axial relationship, each of said conductors being provided with a strip of axially aligned VELCRO surrounding an end portion thereof, and a VELCRO tape covering surrounding each adjoining end of said air flow conductors and covering each aligning strip of VELCRO.

2. An air flow system including spaced air flow conductors in end-to-end axial relationship, each of said conductors being provided with a strip of axially aligned VELCRO surrounding an end portion thereof, a connector between adjoining ends of said air flow conductors, said connector having axially aligned VELCRO surrounding an end portion of each end of said connector, each of said ends of said connector connecting with said VELCRO strips on adjoining ends of said air flow conductors.

3. An air flow system including a blower and a filter unit including a filter housing including a filter material therein, means for securing said blower to a support means, means for securing said filter housing to said support means, means for connecting an output of said blower to an input of said filter unit, said means for connecting said output of said blower to said input of said filter housing including a connector means, VELCRO strips connected to one surface of an end portion said output of said blower and to one surface of an end portion of said connector means and axially aligned VELCRO strips connected to one end portion of said input of said filter housing, and to one end portion of said connector means.

4. An air flow system as set forth in claim 3, which includes a top plate secured to an output end of said filter housing by VELCRO, said top plate including an outlet, an air flow conductor, said air flow conductor is connected to said top plate outlet by VELCRO.

5. An air flow system as set forth in claim 3, in which said blower is secured to a first support plate by VELCRO and said first support plate is secured to said support means by VELCRO, said filter housing is secured to a second plate by VELCRO and said second plate is secured to said support means by VELCRO.

6. An air flow system as set forth in claim 5, in which said first and second support plates each include vibration dampers on their bottom surface, and said vibration dampers include VELCRO on their bottom surface each of which are secured to compatible VELCRO on said support means.

7. An air flow system as set forth in claim 5, which includes a top plate secured to an output end of said filter housing by VELCRO, said top plate including an outlet, an air flow conductor, said air flow conductor is connected to said top plate outlet by VELCRO.

8. An air flow system as set forth in claim 7, which includes a first gasket between said filter housing and said second support plate, said first gasket is secured to said second support plate by an adhesive and said filter housing is secured to said gasket by VELCRO, said filter housing and said second gasket is secured to said top plate by an adhesive and said filter housing is secured to said second gasket by VELCRO.

9. An air flow system as set forth in claim 8, in which the top surface of said filter housing is covered by a TEFLON tape and an adhesive is placed on said TEFLON tape upon which said second gasket is secured to the TEFLON tape by said adhesive and said filter housing is secured to said second gasket by VELCRO.

10. An air flow system as set forth in claim 8, in which said first and second support plates each include vibration dampers on their bottom surface, and said vibration dampers include VELCRO on their bottom surface each of which are secured to compatible VELCRO on said support means.

11. An air flow system as set forth in claim 10, in which said vibration dampers and said gaskets are formed by closed cell material.

12. An air flow system as set forth in claim 10, in which each end-to-end connection includes VELCRO surrounding an outer surface of an adjacent end of each piece to be connected and a VELCRO tape covers the VELCRO on each adjacent end to connect said pieces together.

13. An air flow system as set forth in claim 12, in which in each overlapping connection VELCRO surrounds adjacent inner and outer surfaces of the pieces to be connected that overlap.

* * * * *